US008621725B2

(12) United States Patent
Ortiz et al.

(10) Patent No.: US 8,621,725 B2
(45) Date of Patent: Jan. 7, 2014

(54) LARGE WIRE ANTI-THEFT DEVICE

(75) Inventors: Hector P. Ortiz, Sunny Isles, FL (US); Ramon Reyes, Sweetwater, FL (US)

(73) Assignee: Horsepower Electric Inc., Hialeah, FL (US)

( * ) Notice: Subject to any disclaimer, the term of this patent is extended or adjusted under 35 U.S.C. 154(b) by 96 days.

(21) Appl. No.: 13/313,076

(22) Filed: Dec. 7, 2011

(65) Prior Publication Data

US 2013/0145583 A1    Jun. 13, 2013

(51) Int. Cl.
   *F16G 11/04*    (2006.01)
(52) U.S. Cl.
   USPC ..... 24/136 L; 24/122.6; 174/74 R; 174/77 R; 174/82; 174/83
(58) Field of Classification Search
   USPC ......... 24/135 R, 135 A, 136 B, 122.3, 136 L, 24/115 R; 403/247, 275, 216, 185; 174/74 R, 75 D, 76, 77 R, 78, 79, 80, 174/94 R, 94 S, 88 R, 89, 82, 83
   See application file for complete search history.

(56) References Cited

U.S. PATENT DOCUMENTS

| 1,577,003 | A | * | 3/1926 | Sunderland | 24/122.3 |
| 1,680,347 | A | * | 8/1928 | Sunderland | 403/275 |
| 2,443,155 | A | * | 6/1948 | Zahutnik | 403/211 |
| 2,443,335 | A | * | 6/1948 | Vogel | 24/136 L |
| 2,686,963 | A | * | 8/1954 | Freyssinet | 264/249 |
| 2,934,364 | A | * | 4/1960 | Conversy | 403/216 |
| 3,048,908 | A | * | 8/1962 | Bryan | 403/202 |
| 3,220,074 | A | * | 11/1965 | Ehmann | 403/275 |
| 3,254,383 | A | * | 6/1966 | Ehmann | 403/275 |
| 3,475,795 | A | * | 11/1969 | Youngblood | 24/122.6 |
| 3,600,765 | A | * | 8/1971 | Rovinsky et al. | 24/122.6 |
| 3,605,202 | A | * | 9/1971 | Barredo De Valenzuela | 24/122.6 |
| 3,676,899 | A | * | 7/1972 | Ehlert | 403/247 |
| 3,775,811 | A | * | 12/1973 | Smrekar et al. | 24/122.6 |
| 3,868,191 | A | * | 2/1975 | King, Sr. | 403/216 |
| 4,367,568 | A | * | 1/1983 | Weiser | 24/122.6 |
| 4,507,008 | A | * | 3/1985 | Adl et al. | 403/275 |
| 4,673,309 | A | * | 6/1987 | Schlaich et al. | 403/265 |
| 5,862,589 | A | * | 1/1999 | Chadbourne et al. | 29/882 |
| 6,548,761 | B1 | * | 4/2003 | Wang | 174/74 R |
| 6,748,708 | B1 | * | 6/2004 | Fuzier et al. | 52/223.13 |
| 7,709,739 | B2 | * | 5/2010 | Ferragut et al. | 174/74 R |
| 7,880,612 | B2 | | 2/2011 | Caswell | |
| 2004/0040123 | A1 | * | 3/2004 | Tillitski | 24/136 L |
| 2008/0289870 | A1 | | 11/2008 | Butler | |
| 2009/0095500 | A1 | | 4/2009 | Ygnelzi et al. | |

* cited by examiner

*Primary Examiner* — Robert J Sandy
*Assistant Examiner* — Abigail E Morrell
(74) *Attorney, Agent, or Firm* — McHale & Slavin, P.A.

(57) ABSTRACT

A large wire anti-theft device having a first body and a second body, the anti-theft device accepts passage of a large wire for inhibiting movement of a large wire by friction and compression for inhibiting movement of the large wire through the first body and the second body. A tension force applied to the large wire shall cause tightening of the first body and the second body against the large wire for preventing theft of the large wire.

8 Claims, 4 Drawing Sheets

LARGE WIRE ANTI-THEFT DEVICE

FIELD OF THE INVENTION

The present invention relates generally to the field of anti-theft devices and more particularly, to an anti-theft device used to inhibit thievery of large wire.

BACKGROUND OF THE INVENTION

In recent years, the price of copper and other metals has steadily increased due to industrialization of countries around the world. The price of certain metals has increased dramatically leading to a market that supports thievery of used wire wherein the wire is either reused or the conductor reclaimed. A common conductor is copper, known for its low resistivity and ease of bending, which is stolen and sold to recycling facilities. The most common metals stolen are copper, aluminum, brass and bronze.

The theft results in downed street lights, street signals and pedestrian walkways due to a loss of power resulting in perilous roadway conditions for drivers and pedestrians alike, as well as thousands of dollars in damage including expenses relating to replacement wiring, machinery and man hours.

In 2011, a pedestrian was killed near Miami, Fla. while attempting to cross a road where the street lights were inoperable due to copper wire theft. In Fresno, Calif., thieves stealing copper wire from city street lights are costing the city about $50,000 per month, over 2,500 street lights have been stripped to date. In Davis, Calif., six miles of copper wire was stolen from electrical boxes for street lights. Miles of copper wire was stolen from street lights lining the main highway through South Florida. Thieves will cut copper wiring at a location and spool the wire onto a cable reel allowing thieves to take many miles of copper cable at a time.

This problem is not limited to the United States. In January of 2011, 300 meters of copper wire was stolen which resulted in the derailment of an ICE train near the Dutch city of Zevenaar. In November of 2011, copper wire from street poles was stolen from the Halifax Stanfield International Airport.

In addition to the loss of the wire, costs include replacement labor. Subsequent to a theft, the wiring must be replaced quickly to restore power and protect the communities from electrocution from exposed wiring and other unsafe conditions.

Typical counter measures include law enforcement officials working in close conjunction with scrap metal dealers, as well as implementing resale waiting periods and intrusion detection. Various attempts have also been made to prevent theft of the wire.

U.S. Patent Publication No. US2009/0095500A1 discloses a locking cap to safeguard metal wiring in a utility pole which may include a base adapted to be detachably mounted to the utility pole by at least one fastener and a shield adapted to be locked to the base.

U.S. Pat. No. 7,880,612 discloses a method and alarm device used to prevent metal theft from irrigation systems including attaching an alarm device to a preexisting irrigation circuit, monitoring a continuous voltage to detect for integrity breach in an electric conductor.

U.S. Patent Publication 2008/0289870 discloses a wire clamping element placed on a base of an electrical fixture supporting pole for clampingly securing an electrical wire cable to a vertical surface.

What is lacking in the art is a device that prevents the theft of large sized wire without breaching the integrity of the wire.

SUMMARY OF THE INVENTION

The instant invention is directed to an anti-theft device for large wire. In particular, the device is suited for large copper wire that interconnects miles of street lights with minimal junctions. The large wire anti-theft device of the instant invention is positioned inside of the wire conduit pipe, typically placed underground. The device is positioned at various locations along the length of the wire preventing retraction of the wire without first removal of the anti-theft device. The instant invention prevents spooling wire onto a cable reel or otherwise removing larger wire that passes through PVC pipe at any point. This prevents the theft of miles worth of large wire in a single instance.

Accordingly, it is an objective of the instant invention to provide an anti-theft device that prevents removal of wire housed within a conduit.

It is a further objective of the instant invention to prevent spooling theft where thieves are able to quickly reel large lengths of wire.

It is yet another objective of the instant invention to provide a mechanism that that sandwiches the wire causing frictional clamping to prevent movement of the wire.

Yet still another objective of the instant invention is to provide a low cost anti-theft device that can be used current conduit installations.

Still another objective of the instant invention is to provide an anti-theft device that maintains wires in a spaced apart position to eliminate any chaffing at the theft device collection points.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
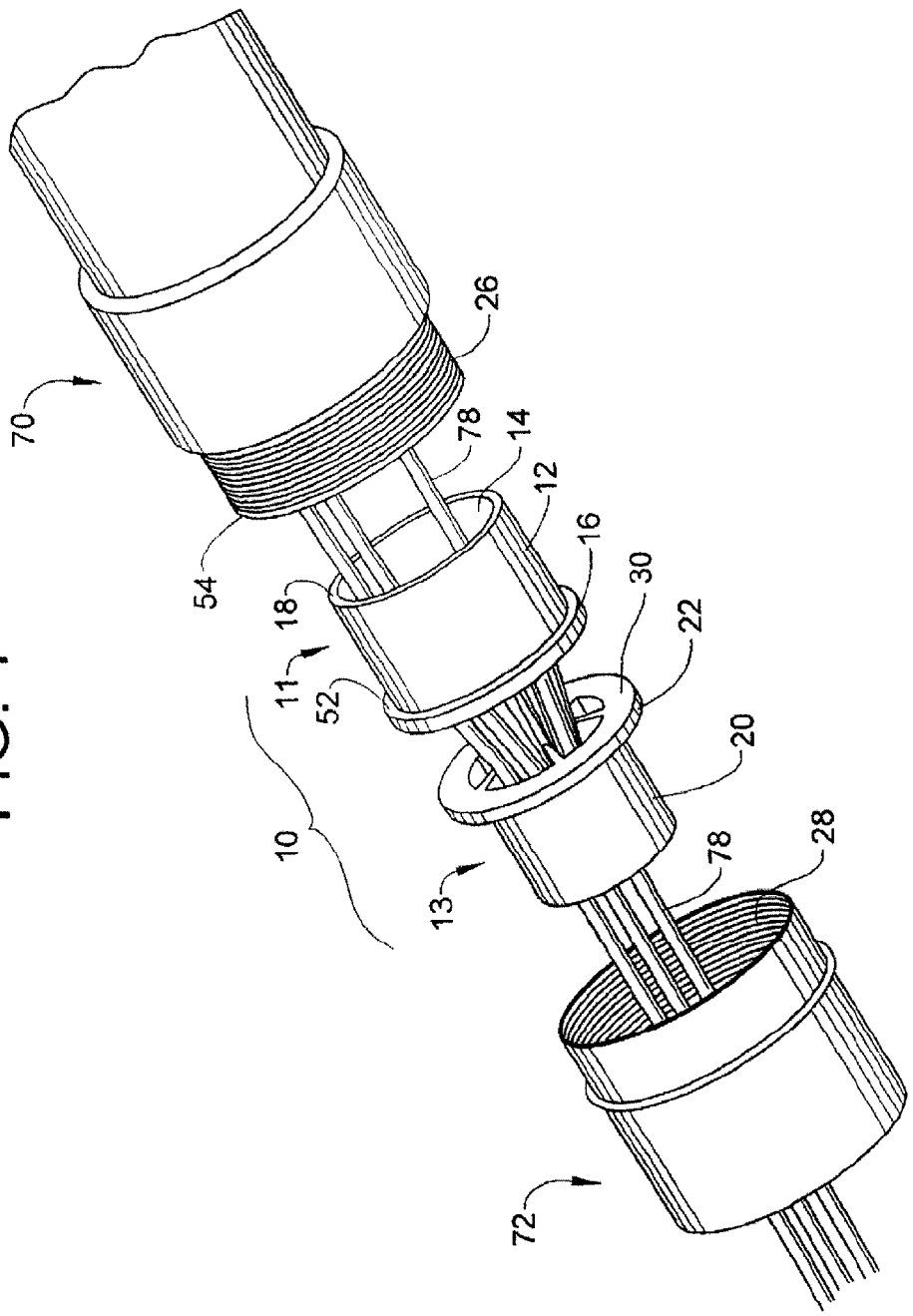
FIG. 1 shows an exploded view of the large wire anti-theft device.
Figure 2:
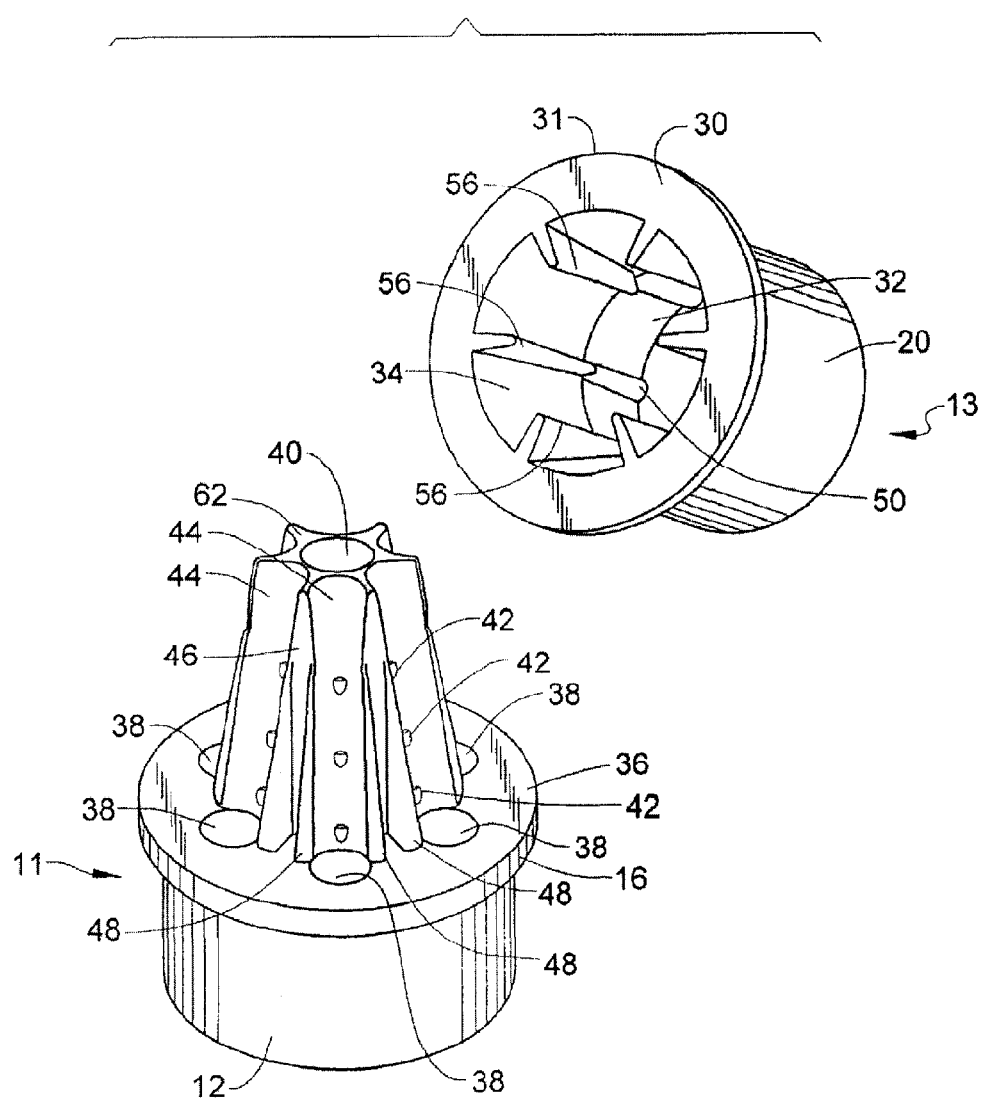
FIG. 2 shows a perspective view of the large wire anti-theft device.

Referring now to the drawings and initially to FIG. 1 set forth is a large wire anti-theft device 10 for preventing theft of large cable wires. The anti-theft device 10 includes a first member 11 and a second member 13 (FIGS. 1 and 2). The first member 11 is formed from a rigid circular shaped housing having a sidewall defined by an outer surface 12 and an inner surface 14. A ring element formed about an edge of the sidewall, the ring element includes a flat surface 52 extending outwardly from the outer surface 12 to form a continuous lip, an outer surface 16, a front surface 36, and a back surface 18.

The front surface 36 includes a plurality of aperture 38 each configured to permit a large wire to pass therethrough.

A conically shaped guide body extends outwardly from the front surface 36 to a distal surface 62. The guide body is defined by a plurality of concaved shaped wire guides 44 positioned between fin surface guides 46 and at least one side fin guide 48. Each fin surface guide 46 includes two opposing side fin guides 48 situated thereon. The distal surface 62 includes a centrally disposed aperture 40 that permits a large wire to pass therethrough in addition to the pass through apertures 38. The wire guide 44 may be formed to match the shape of a large wire 78. Each wire guide 44 surface may include a number of raised protrusions 42 for use in frictionally engaging the wire.

In the embodiment depicted, the front surface 36 includes six holes around the perimeter and a centrally located aperture 40 effectively allowing 7 wires to properly position with the device. The six wire guides 44 extending out from front surface 36 form the outer surface of the guide body, received into the second member conduit.

The second member 13 is formed from a sidewall having an outer surface 20, inner surface 32, locking surface 34. A second ring element formed about an edge of the sidewall, the ring element includes a flat surface 31, an outer surface 22, and a reciprocal front surface 30. The circumference of locking surface 34 reduces from reciprocal front surface 30 to inner surface 32. A plurality of fins 56 extend from the locking surface 34 to the inner surface 32, where they transition to inner surface fins 50. The second member 13 permits large wires to pass centrally.

The flat surface 52 of the first member 11 is constructed and arranged to abut the edge 54 of a male adapter member 70. The male adapter member 70 has male threading 26. Alternatively, the flat surface 52 is constructed and arranged to abut an inner ring of a female adapter member 72. The female adapter member 72 has female threading 28. The inner ring of a female adapter member 72 is constructed and arranged to impede either first member 11 or second member 13 from passing therethrough. The male threading 26 and the female threading 28 threadingly engage each other.

Figure 3:
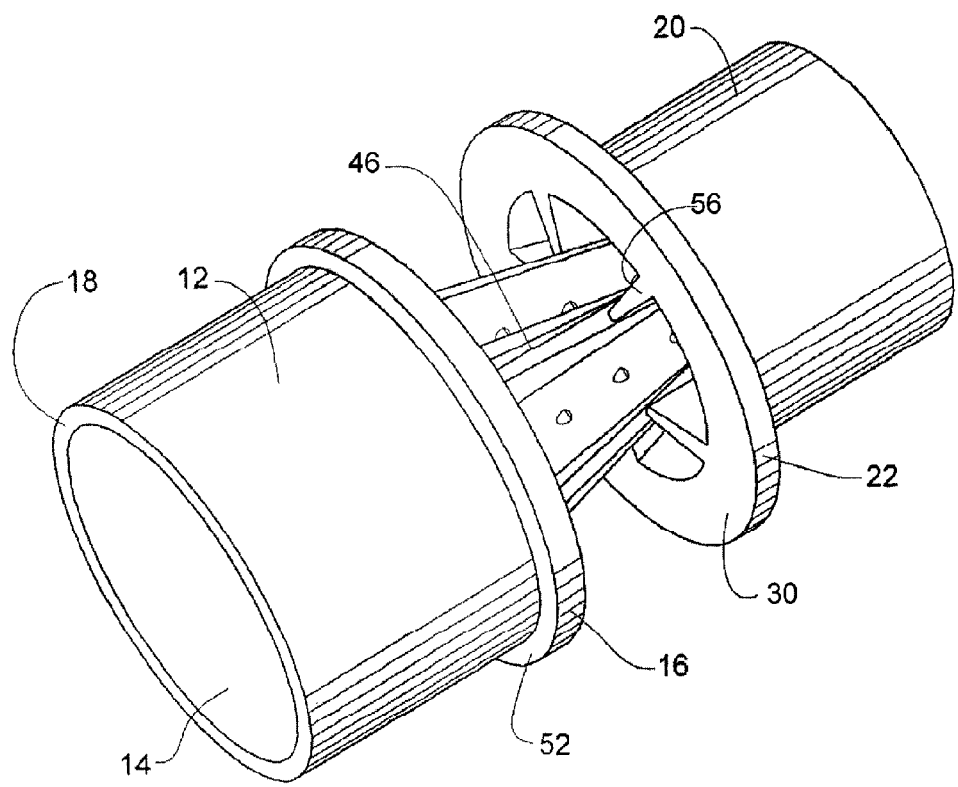
FIG. 3 shows a perspective view of a second member engaging a first member.

The second member 13 slidingly engages the first guide body of the first member 11. In particular, each fin 56 is constructed and arranged to slide along the fin surface guide 46 and engage between opposing side fin guides 48 (FIG. 3). The first member 11 and the second member 13 may be secured inside two connecting pipe members. The two connecting pipe adapter members are preferably PVC or metal adapter members being one male and one female adapter members that screwingly engage to prevent the first member and the second member from complete separation relative to each other.

In the disclosed embodiment, the male adapter member 70 is a 2" conduit shown holding seven 6 gauge (AWG) wires; however, any sized PVC pipe is contemplated and compatible. The female adapter member 72 constructed with a lip member to prevent over rotation between the male adapter and the female adapter.

The engagement of male adapter member 70 and female adapter member 72 causes locking surface 34 to press against at least one large wire 78 causing the wire 78 to press against wire guide 44 and a number of raised protrusions 42. The engagement of wire guide 44, a number of raised protrusions 42 and locking surface 34 prevent movement of at least one large wire through the plurality of holes 38. The first member and the second member may be formed of plastic, metal or Nylon. Particularly, the anti-theft device may be formed of Nylon 6/6 with 33% glass fill.

The system includes a method of installation including the steps where one of the first member 11 and the second member 13 is placed onto a first adapter having one of male and female threading; wires are fed through both the first member 11 and the second member 13. The cone of the first member 11 is inserted into the conduit of the second member 13. A second adapter that threadingly engages the first adapter to a desired tightness.

Figure 4:
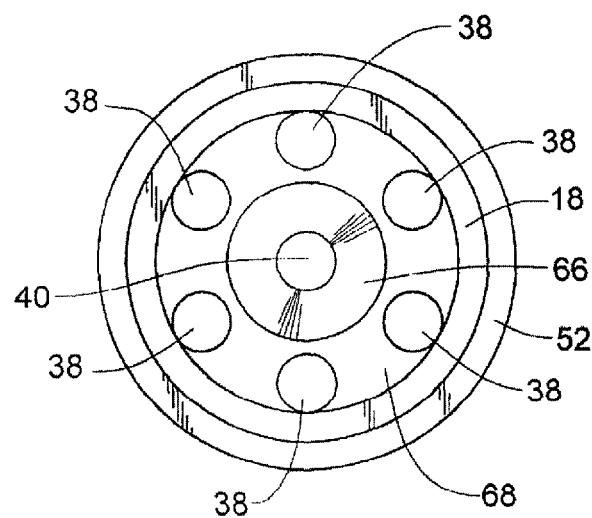
FIG. 4 shows a rear view of a first member.
Figure 5:
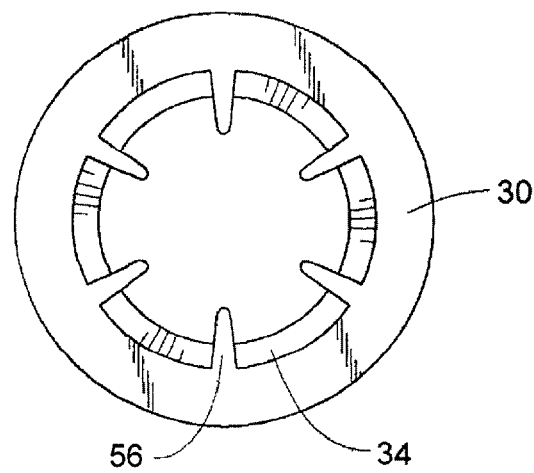
FIG. 5 shows a front view of front view of a second member.

In an exemplary embodiment, the first member 11 generally comprised of: a sidewall having an outer surface 12 having a diameter between 2.1 and 1.9 inches and an inner surface 14, a ring element formed about an edge of the sidewall having a maximum diameter of 2.2 inches, the ring element includes a flat surface 52, an outer surface 16, and a front surface 36. The front surface 36 includes a plurality of holes 38 having a diameter of 0.344 inches. The holes 38 are each configured to permit a cable to pass therethrough. A first guide body that extends perpendicularly 1.5 inches out from the front surface 36. The first guide body outer surface includes at least one concaved wire guide 44 where an 80° acute angle exists between each concaved wire guide 44 outer surface and front surface 36, distal surface 62, at least one fin surface guide 46, at least one side fin guide 48 and inside wall surface 66 (FIGS. 2 and 4). Each fin surface guide 46 includes two opposing fin guides situated thereon. The distal surface 62 includes a central hole 40 that permits a large wire 78 to pass therethrough. The wire guide 44 may be formed to match the shape of a wire 78. Each wire guide 44 surface may include a number of raised protrusions 42. The first guide body includes a hole 40 that permits a large wire 78 to pass therethrough. In one variation of the anti-theft device, the front surface 36 includes six holes. Additionally, six wire guides 44 extend out from front surface 36. The six wire guides 44 extending out from front surface 36 form the outer surface of a cone. The cone is received into the second member 13 conduit. The second member 13 generally comprised of: a sidewall having an outer surface 20 having a diameter of 1.95 inches, inner surface 32, locking surface 34 having a 10° acute angle relative the outer surface, a ring element formed about an edge of the sidewall, the ring element includes a flat surface 31, an outer surface 22, and a reciprocal front surface 30. Flat surface 31 opposes reciprocal front surface 30. The circumference of locking surface 34 reduces from reciprocal front surface 30 to inner surface 32. A plurality of fins 56 extend from the locking surface 34. The second member 13 permits large wires to pass centrally.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A large wire anti-theft device comprising:
    a first member formed from a substantially cylindrical shaped housing having a front surface with a plurality of apertures extending therethrough, said front surface including a generally conical guide body extending outwardly therefrom, said guide body having concave shaped wire guides constructed and arranged to correspond with each said aperture;
    a second member formed from a substantially cylindrical shaped housing and defined by an inner wall and an outer wall, said inner wall including a narrowing circumference constructed and arranged to receive said guide body; and
    at least one fin formed along said inner wall of said second member and at least one fin guide formed along an outer surface of said guide body, said at least one fin is capable of sliding between said at least one fin guide; wherein wires placed through said apertures of said first member and drawn along said concave shaped wire guides frictionally engage said second member whereby placement of said first member and second member within a threaded pipe prevents wire movement.

2. The wire anti-theft device of claim 1 wherein said front surface of said first member includes a ring extending outwardly for use in engaging an end of said threaded pipe.

3. The wire anti-theft device of claim 1 wherein each said fin must fit within a corresponding fin guide to allow alignment of said first member and said second member.

4. The wire anti-theft device of claim 1 wherein each said fin operates to prevent rotation of said first member in relation to said second member.

5. The wire anti-theft device of claim 1 including at least one protrusion on the surface of said concave shaped wire guides, said at least one protrusion increases the frictional force when said first member and said second member sandwich one of said wires therebetween.

6. The wire anti-theft device of claim 1 wherein said first member and said second member are formed of a non-metallic material.

7. The wire anti-theft device of claim 6 wherein said non-metallic material is Nylon 6/6 and 33% glass.

8. The wire anti-theft device of claim 1 wherein said guide member includes a centrally located aperture.

* * * * *